United States Patent
Schneider

(10) Patent No.: US 9,134,973 B2
(45) Date of Patent: Sep. 15, 2015

(54) DYNAMIC COMPILING AND LOADING AT RUNTIME

(75) Inventor: James P. Schneider, Raleigh, NC (US)

(73) Assignee: Red Hat, Inc., Raleigh, NC (US)

(*) Notice: Subject to any disclaimer, the term of this patent is extended or adjusted under 35 U.S.C. 154(b) by 1294 days.

(21) Appl. No.: 12/394,007

(22) Filed: Feb. 26, 2009

(65) Prior Publication Data
US 2010/0218174 A1  Aug. 26, 2010

(51) Int. Cl.
*G06F 9/45* (2006.01)

(52) U.S. Cl.
CPC .................................. *G06F 8/41* (2013.01)

(58) Field of Classification Search
CPC ............................... G06F 9/45516; G06F 8/41
USPC .................................................. 717/140, 148
See application file for complete search history.

(56) References Cited

U.S. PATENT DOCUMENTS

| | | | | |
|---|---|---|---|---|
| 6,151,703 A * | 11/2000 | Crelier | ........................... | 717/136 |
| 6,851,109 B1 * | 2/2005 | Alexander et al. | ............ | 717/148 |
| 6,973,646 B1 * | 12/2005 | Bordawekar et al. | ......... | 717/146 |
| 7,340,730 B2 * | 3/2008 | Arkwright et al. | ............ | 717/148 |
| 7,725,885 B1 * | 5/2010 | Pradhan et al. | ................ | 717/148 |
| 2003/0071844 A1 * | 4/2003 | Evans | ........................... | 345/763 |
| 2005/0114848 A1 * | 5/2005 | Choi et al. | .................... | 717/148 |
| 2005/0273772 A1 * | 12/2005 | Matsakis et al. | .............. | 717/136 |
| 2007/0234307 A1 * | 10/2007 | Luk et al. | ...................... | 717/130 |
| 2008/0016507 A1 * | 1/2008 | Thomas et al. | ................ | 718/100 |
| 2008/0046870 A1 * | 2/2008 | Nair et al. | ..................... | 717/140 |
| 2009/0024986 A1 * | 1/2009 | Meijer et al. | .................. | 717/137 |
| 2009/0113402 A1 * | 4/2009 | Chen et al. | .................... | 717/140 |

* cited by examiner

*Primary Examiner* — Wei Zhen
*Assistant Examiner* — Mohammed Huda
(74) *Attorney, Agent, or Firm* — Lowenstein Sandler LLP

(57) ABSTRACT

A compiler is loaded by a computing device using an evaluation function that is included in a program in a compiled form. The evaluation function causes the compiler to compile source code for the program, wherein the source code includes new instructions that are uncompiled, and wherein compiling the source code generates compiled code that includes the new instructions. The evaluation function loads the compiled code into memory, retrieves the new instructions, and executes the new instructions. The evaluation function may perform these operations during runtime of the program that includes the evaluation function.

24 Claims, 4 Drawing Sheets

DYNAMIC COMPILING AND LOADING AT RUNTIME

TECHNICAL FIELD

Embodiments of the present invention relate to dynamic loading, and more specifically to dynamically compiling and loading source code at run time.

BACKGROUND

A programming language is an artificial language designed to express computations that can be performed by a machine such as a computer. All programming languages translate code from human readable form to a non-human readable form. There are loosely two common classes of programming languages: interpreted languages and compiled languages. In a compiled language, source code is translated directly into a machine readable code (code that contains instructions that can be executed by a particular physical or virtual machine) once. Examples of compiled languages include C, C++ and Java. In an interpreted language, source code is translated into an intermediate form that is later further translated to machine readable code each time the code is to be run. Examples of interpreted languages include Perl and command shells.

The distinction between compilers and interpreters is blurred by languages that translate human readable source code into machine readable form that's not actually machine code (e.g., Java). An important distinction between compiled languages such as Java and interpreted languages (e.g., Perl) is based on when translation occurs. If translation occurs once for a given piece of code (as in Java), then the language is a compiled language. If the translation occurs every time the code is run (e.g., every time a new process that executes the particular code starts), then the language is an interpreted language (e.g., as in Perl).

Some interpreted languages include a function called the evaluate ('eval') function, which is a mechanism for executing instructions that have not yet been transformed into an intermediate form. However, conventional compiled languages do not have an ability to convert programming statements into an executable form at runtime.

BRIEF DESCRIPTION OF THE DRAWINGS

The present invention is illustrated by way of example, and not by way of limitation, in the figures of the accompanying drawings and in which.

DETAILED DESCRIPTION

Figure 1:
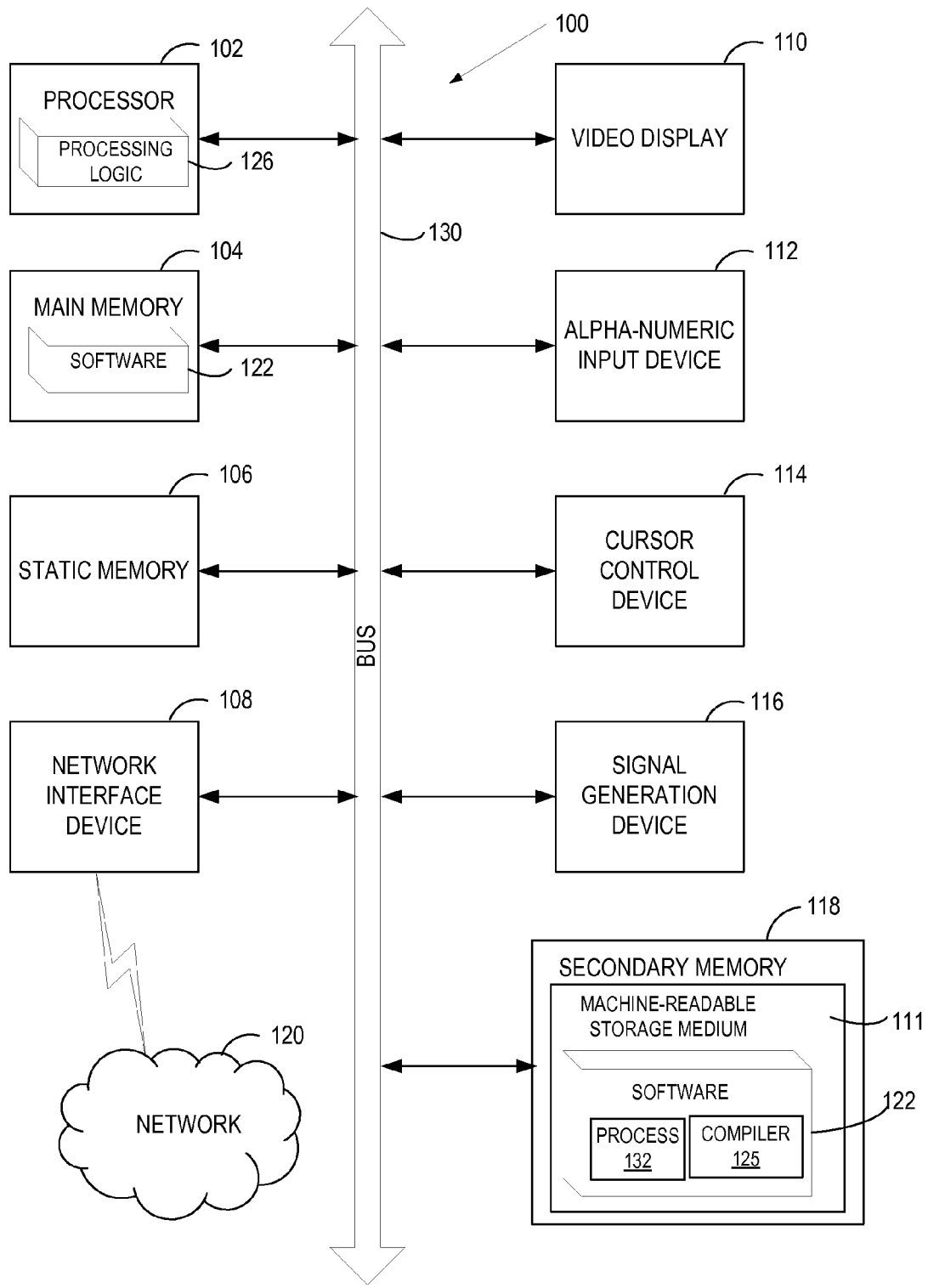
FIG. 1 illustrates a diagrammatic representation of a machine in the exemplary form of a computer system, in accordance with one embodiment of the present invention.

Described herein is a method and apparatus for dynamically loading uncompiled code or files. In one embodiment, a compiler is loaded by a computing device using an evaluation function that is included in a program in a compiled form. The evaluation function causes the compiler to compile source code for the program, wherein the source code includes new instructions that are uncompiled, and wherein compiling the source code generates compiled code that includes the new instructions. The evaluation function loads the compiled code into memory, retrieves the new instructions, and executes the new instructions. The evaluation function may perform these operations during runtime of the program that includes the evaluation function. The compiled code may be machine code, byte code, p-code, or subroutine-threaded code.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "calling", "loading", "compiling", "executing", "generating", "performing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.)), etc.

FIG. 1 illustrates a diagrammatic representation of a machine in the exemplary form of a computer system 100 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 100 includes a processor 102, a main memory 104 (e.g., read-only memory (ROM), flash memory, dynamic random access memory (DRAM) such as synchronous DRAM (SDRAM) or Rambus DRAM (RDRAM), etc.), a static memory 106 (e.g., flash memory, static random access memory (SRAM), etc.), and a secondary memory 118 (e.g., a data storage device), which communicate with each other via a bus 130.

Processor 102 represents one or more general-purpose processing devices such as a microprocessor, central processing unit, or the like. More particularly, the processor 102 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 102 may also be one or more special-purpose processing devices such as an application specific integrated circuit (ASIC), a field programmable gate array (FPGA), a digital signal processor (DSP), network processor, or the like. Processor 102 is configured to execute the processing logic 126 for performing the operations and steps discussed herein.

The computer system 100 may further include a network interface device 108. The computer system 100 also may include a video display unit 110 (e.g., a liquid crystal display (LCD) or a cathode ray tube (CRT)), an alphanumeric input device 112 (e.g., a keyboard), a cursor control device 114 (e.g., a mouse), and a signal generation device 116 (e.g., a speaker).

The secondary memory 118 may include a machine-readable storage medium (or more specifically a computer-readable storage medium) 131 on which is stored one or more sets of instructions (e.g., software 122) embodying any one or more of the methodologies or functions described herein. The software 122 may also reside, completely or at least partially, within the main memory 104 and/or within the processing device 102 during execution thereof by the computer system 100, the main memory 104 and the processing device 102 also constituting machine-readable storage media. The software 122 may further be transmitted or received over a network 120 via the network interface device 108.

The machine-readable storage medium 131 may also be used to store a process 132, an uncompiled file (not shown) and/or a compiler 125 and/or a software library (not shown) containing methods that call, for example, the compiler 125. Embodiments of the process 132 and compiler 125 are described below with reference to FIGS. 2A-2B.

Returning to FIG. 1, while the machine-readable storage medium 131 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

Figure 2A:
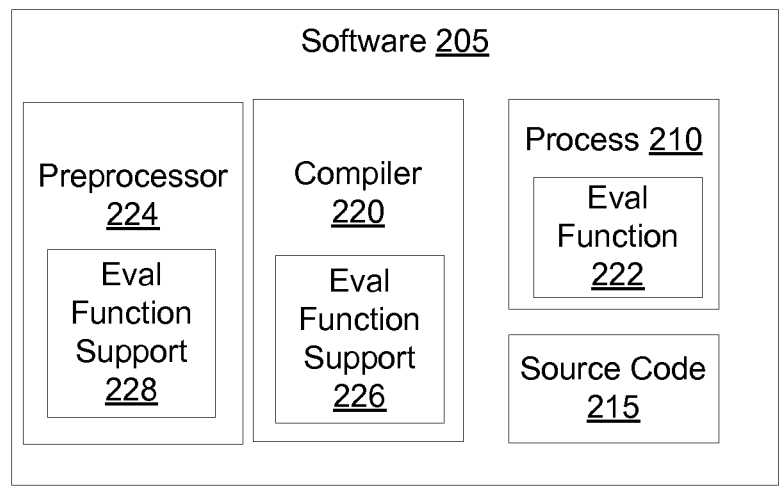
FIG. 2A illustrates software including instructions that may be executed by the computer system of FIG. 1 to perform actions in accordance with embodiments of the present invention.
Figure 2B:
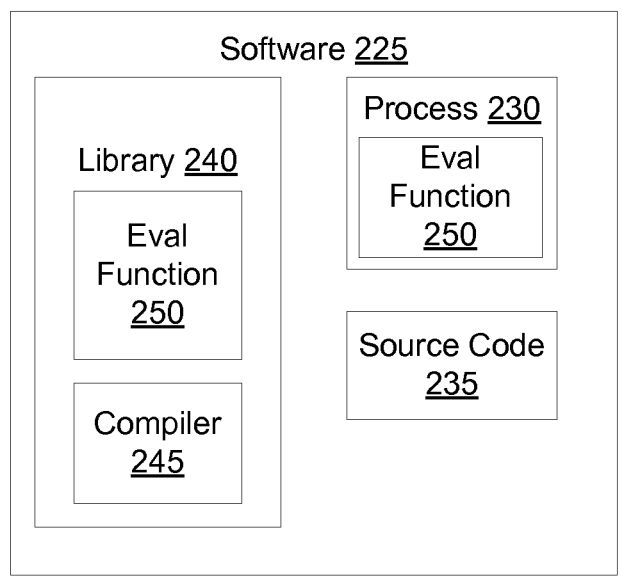
FIG. 2B illustrates additional software including instructions that may be executed by the computer system of FIG. 1 to perform actions in accordance with embodiments of the present invention.

FIGS. 2A-2B illustrate software including instructions that may be executed by the computer system 100 of FIG. 1 to perform actions in accordance with embodiments of the present invention. FIG. 2A includes a process 210, source code 215 and a compiler 220.

Source code 215 is instructions that, once compiled, can be executed by a machine. The source code 215 may be written in any compiled language such as C, C++, BASIC, Fortran, Pascal, Java and so on. In one embodiment, source code 215 is included in an uncompiled file.

The source code 215, once compiled, provides functions and/or variables that may be accessed and used (e.g., dynamically loaded) by an application, service or other software such as process 210. In one embodiment, the source code 215 is an uncompiled plugin to process 210. A plugin is a computer program that interacts with a host application or other software to provide a specific function to the host application/software. The plugin may rely on a host application's user interface (e.g., a user interface of process 210). In another embodiment, the source code 215 is an uncompiled extension to process 210. An extension is a computer program designed to enhance the functionalities of a host application (e.g., of process 210). Alternatively, the source code 215 may simply be one or a few strings of code that provide, for example, instructions for a single function or variable to process 210.

Compiler 220 is a computer program that transforms source code written in a particular computer language (e.g., source code 215) into compiled or machine readable code (e.g., machine code, byte code, etc.). The machine readable code is then executable by a particular hardware platform's processor. Typical compilers perform one or more of lexical analysis, code parsing, code generation, code optimization, preprocessing and semantic analysis.

In one embodiment, compiler 220 is a compiler for a traditional compiled language (e.g., C or C++) that has been modified to include eval function support 226. Compiler 220 may also be a compiler for Java that has been modified to include the eval function support 226. Alternatively, no compiler support may be necessary to implement the eval function. In such an embodiment, compiler 220 may be a traditional compiler that has not been modified to include any eval function support 226.

Process 210 may be any computer program, application or service that includes instructions for an evaluate (eval) function 222 that enables the process 210 to evaluate a string (or multiple strings) as though it were one or more statements (an individual executable unit of code). For example, the string "return 0;" in C is a statement that contains the "return" keyword (which tells the compiler to generate code to execute the correct function) and the expression "0." The eval function 222 can supply syntactic wrappings so that a piece of functionality itself can be compiled as an independent unit. For example, in C/C++ a function definition structure may be wrapped around the code to be evaluated, and in Java a class definition structure may be wrapped around the code to be evaluated.

After the source code 215 is evaluated (e.g., compiled), the eval function 222 causes it to be dynamically loaded. Dynamic loading is a mechanism that enables a process (e.g., an application or program) to add executable code to its executable image and configure it to execute, at runtime (the time during which the process is running). Typically, dynamic loading includes loading a file into memory during runtime. In conventional dynamic loading, the file and/or instructions that are loaded into memory must be executable (e.g., machine code, byte code, etc.). However, embodiments of the present invention enable process 210 to dynamically load uncompiled files and/or source code 215 into memory during runtime via the eval function 222.

To dynamically load source code 215, eval function 222 calls compiler 220 at runtime of process 210, passes to compiler 220 source code 215, receives from compiler compiled code (e.g., machine code), and executes the compiled code. The precise mechanics of the eval function 222 would depend on how an implementer intended that it be used. At its simplest, it would just wrap and execute a simple string. For example, doing this in Java could look like this:

```
public class EvalExample {
    public static void main(String [ ] args) {
        eval("System.out.println(\"Hello, World!\");");
    }
}
```

More specifically, in Java the eval function 222 (e.g., the eval( ) method coded above) would receive a string to evaluate. This string in one embodiment resides in source code 215. The eval function 222 can create a temporary class, with a single method (e.g., doEval) that performs the code that was passed as a string to evaluate. The eval( ) method may create a file that gets compiled, or may operate on InputStream and Output Stream objects, which can be tied to arrays in memory. In Java, the anonymous class would look something like this:

```
public class EvalTmpClassYuHkSieEUfgwdlFrAl3b1w {
    public static void doEval( ) { System.out.println("Hello, World!"); } }
```

The eval function 222 would call compiler 220 (in this example a Java compiler) and pass to compiler 220 the created temporary class, along with an instruction to compile source code 215 and to return a compiled class. Upon receipt of the compiled class, the eval function 222 causes the compiled class to be loaded (most likely, by passing the class file data to a ClassLoader subclass defineClass( ) method). The eval function 222 would then call the doEval( ) method on the freshly loaded class. Any temporary files that were created during the compiling of the source code 215 could then be deleted.

In one embodiment, the eval function is implemented in process 210 without requiring any modification to a compiler (e.g., compiler 220) that was used to compile process 210. However, in order for the eval function 222 to be more tightly integrated with process 210 (e.g., have the evaluated code execute in the same execution scope as the caller, which would let evaluated code access and modify the variables defined in the enclosing scope), some compiler eval function support 226 may be required, which is described in greater detail below.

The above example shows how the eval function 222 and eval function support 226 may operate for the Java programming language. The case for a C program would be analogous, as shown in the following example. Again, at its simplest the eval function would just wrap and execute a simple string, as follows:

```
int main(void) {
    eval("printf(\"Hello, World!\\n\");"); }
```

The eval function 222 would create a subroutine around the passed-in string:
void evalfnYuHkSieEUfgwdlFrA13b1w( ) {printf("Hello, World!\n";}
The eval function 222 would call the compiler 220 and pass the generated source code to the compiler 220. This can be accomplished "off the shelf", if it is acceptable for the instructions in the source code 215 to be only loosely integrated with process 210. The compiler 220 would generate a compiled version of source code 215, and pass it back to process 210. The eval function 222 would receive and call the function included in the compiled version of source code 215, after which any temporary files could be cleaned up.

In one embodiment, in order for instructions generated based on the eval function 222 to be tightly integrated with process 210, compiler 220 includes eval function support 226. Principally, the eval function support 226 records which variables are accessible from the calling scope, and provide some mechanism for the eval function 222 to use this information. This can be accomplished by an eval function support 226 included in the compiler 220, or by eval function support 228 that is included in a preprocessor 224.

A preprocessor 224 is program that runs before the compiler 220 to preprocess code. The amount of processing and type of processing performed by the preprocessor can vary. Some preprocessors can be used to extend the functionality of a programming language. In one embodiment, the preprocessor 224 includes eval function support 228 that records which variables are accessible from the calling scope of eval function 222, and provides some mechanism for the eval function 222 to use this information.

In a more detailed example of an eval function 222 implemented in the C programming language, the eval function 222 may appear as follows:

```
int main( )
{
  int i = 42;
  eval("printf(\" i == %d\\n\",i++);");
  printf("now, i == %d\n", i);
  return 0;
}
```

In this example, the eval function would need access to information about where i is being stored (either on the stack, or in a particular register set). This information can be provided by eval function support 226 or 228, as described below.

Upon execution of the above coded eval function 222, the eval function 222 may create a function definition that looks like this:

```
void evalfnVYQHZMJklF3j__YdfJ0Jg1w(frame_descriptor *f) {
  int *iptr = (int *)lookup(f, "i");
  printf("i == %d", (*iptr)++);
}
```

The frame_descriptor would be a structure that contains the information necessary to find a particular local variable in an enclosing scope by name. This frame descriptor structure could be created at the time that process 210 was compiled by the compiler 220. The compiler 220 would also need to record information on how to find static and global variables in the scope of the calling function. In one embodiment, the eval function support 226 or eval function support 228 provides these capabilities.

In phases, one embodiment of the operations would be:
1) The compiler, using the eval function support 226 or 228, processes the file that contains the definition of the function main, turning it into an object file, and creating a frame descriptor that can be found, based on the name of the enclosing function (for example, it could be stored under the global variable name "_frame_descriptors_main"). It may also record information on how to find out the name of a function from an execution address.
2) When the main function executes, it passes the string 'printf("i==%d\n", i++);' to the eval runtime function. In one embodiment, the eval runtime is either directly passed the appropriate frame descriptor (likely because the compiler or a preprocessor replaced eval(string) with evalruntime(&_frame_descriptors_main, string)), or it figures out the correct descriptor name from the return address of the calling function (in this case, main) and the information recorded by the compiler in operation 1.
3) The eval runtime does a simple parse of the string it's given to replace variable references with virtual references, and determine which variables it needs to look up. Essentially, it tokenizes the string, and replaces identifiers with virtual references.
4) The eval runtime generates the code shown in paragraph [0043] above, causes it to be compiled, loads the compiled result, executes it, and then cleans up.

In one embodiment, the eval runtime does the lookups before it generates the code. In such an embodiment, the generated code may resemble the following:

```
void evalfnVYQHZMJklF3j__YdfJ0Jg1w(int *iptr) {
  printf("i == %d", (*iptr)++);
}
```

If the compiler 220 is a Java compiler, the eval function support 226 and 228 may differ from that described above. Specifically, Java does not directly support pointer or reference types, so the eval function support 226, 228 would include more extensive functionality.

In an example, the eval function may appear as follows:

```
public class Example {
  public static void main(String [ ] args) {
    int i = 42;
    eval("System.out.println(\"i==\"+i++);");
    System.out.println("now, i == "+i);
  }
}
```

This could be translated by eval function support 228 to something like this:

```
public class Example {
  public class Examplemainvariables {
    public String [ ] args;
    public int i;
  }
  public static void main(String [ ] args)
  {
    int i = 42;
    Examplemainvariables e = new Examplemainvariables( );
    e.args = args;
    e.i = i;
    EvalRuntime.eval(e, "System.out.println(\"i == \"+i++);");
    args = e.args;
    i = e.i;
    System.out.println("now, i == "+i);
  }
}
```

The eval method of the EvalRuntime class would be able to use the information provided by the object to pass information back and forth to the evaluated code. Such an implementation is not as efficient as using pointers and references (since the entire scope of the method would need to be copied twice), but is both simple and robust.

EvalRuntime.eval would generate code that looks like this:

```
public class EvalClassVYQHZMJklF3j__YdfJ0Jg1w implements
EvalInterface {
  public evalfn(Object e) {
    int i = EvalRuntime.lookupInt(e, "i");
    System.out.println("i=="+i++);
    EvalRuntime.save(e, "i", i);
  }
}
```

FIG. 2B illustrates similar components to those shown in FIG. 2A. However, in FIG. 2A compiler 220 is an independent application. Therefore, in the embodiment shown in FIG. 2A, a separate and distinct compiler application having an independent allocation of memory and other system resources is used to perform the compiling. This separate compiler application can be initiated by process 210 through a command line tool.

In FIG. 2B, on the other hand, compiler 245 is included in a library 240. Library 240 is a collection of subroutines, classes, functions, variables and other data that can be used by multiple different programs. In one embodiment, the library 240 is a shared library. Components in a shared library can be shared (accessed and loaded into memory) by unrelated applications. In some shared libraries, the components can also be shared in memory (the components only need to be loaded into memory once, and each application can map a different address space to the same physical memory page).

In one embodiment, the library 240 is a dynamically linked library. In a dynamically linked library, subroutines included in the library can be loaded into an application at runtime. Therefore, the subroutines can remain as separate files in the secondary memory, and do not need to be linked to process 230 at compile time. This enables process 230 to load compiler 245 at runtime via dynamic linking. Therefore, process 230 can access compiler 245 only when necessary.

Providing compiler 245 as a component in a dynamically linked library provides a number of advantages. Since the compiler 245 is in the library 240, process 230 does not have to rely on having compiler development tools installed. The compiler's performance (e.g., speed, response time, etc.) can also be increased because process 230 communicates directly with compiler 245 through memory. Moreover, calls can be made to specific portions (e.g., bits of code) in the compiler 245 during different phases of compilation, rather than loading the entire compiler 245 into memory. By providing compiler 245 as a subroutine/component in a dynamically linked library, compiler 245 can be implemented as an extension to applications that are configured to dynamically compile and load files.

In one embodiment, the eval function 250 is also a component of library 240. Therefore, process 230 can load the eval function 250 at runtime and pass it variables, such as an identification of source code 235. This enables process 230 to use the eval function without requiring programmers to program eval functionality into process 230. The loaded eval function 250 can then cause the compiler 245 to also be loaded at runtime, pass compiler 245 source code 235 (e.g., from an uncompiled file), receive compiled instructions, and execute the compiled instructions.

Figure 3:
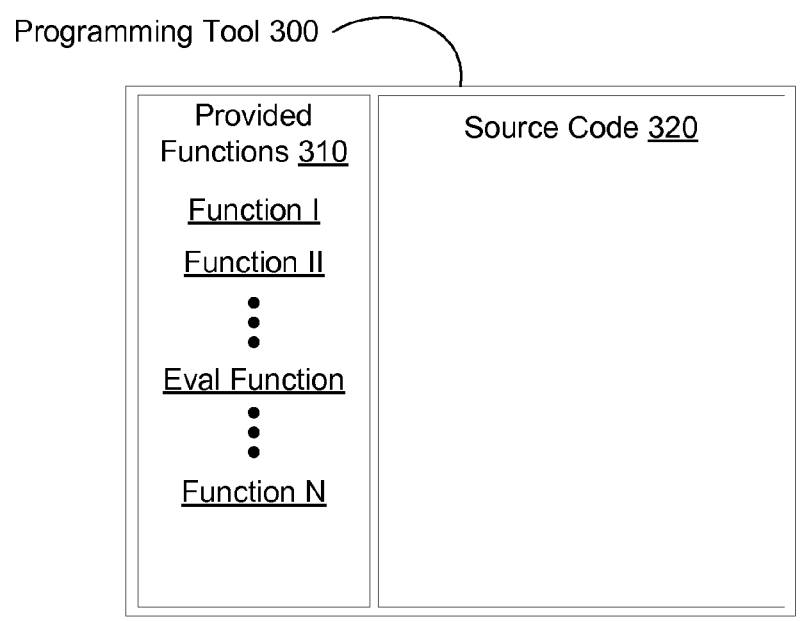
FIG. 3 illustrates a programming tool, in accordance with one embodiment of the present invention.

FIG. 3 illustrates a programming tool 300, in accordance with one embodiment of the present invention. The programming tool 300 may be, for example, an integrated development environment (IDE) or a component of an IDE. The programming tool 300 includes a collection of provided functions 310 for which code has already been written. In one embodiment, in which the programming tool 300 includes a graphical user interface, in order for a programmer to add a provided function (e.g., Function I) to a program that he/she is writing, he/she simply needs to drag an icon or text representing the provided function from a provided functions 310 area of the programming tool 300 to a source code 320 area of the programming tool 300. The code of the function then gets copied into the source code. In one embodiment, the provided functions 310 include an eval function. Therefore, a programmer need not understand how to code an evaluation function for a program written in a programming language that does not include a native eval function (e.g., in a compiled language). The provided eval function may correspond to the eval functions described with reference to FIGS. 2A-2B.

Figure 4:
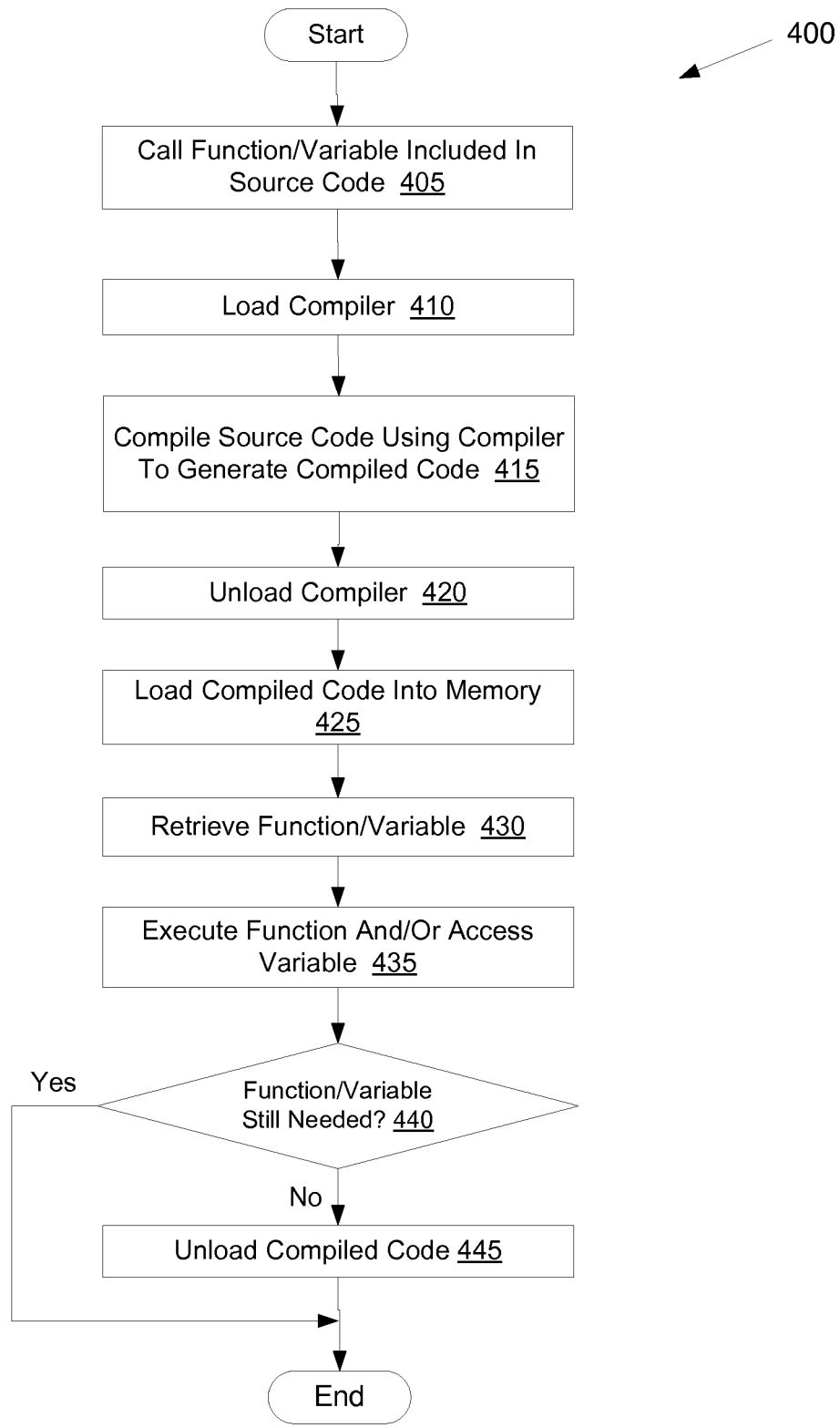
FIG. 4 illustrates a flow diagram of one embodiment for a method of adding functionality to a compiled process.

FIG. 4 illustrates a flow diagram of one embodiment for a method 400 of adding functionality to a compiled process. Method 400 may be performed by processing logic that may comprise hardware (e.g., circuitry, dedicated logic, programmable logic, microcode, etc.), software (such as instructions run on a processing device), or a combination thereof. In one embodiment, method 400 is performed by computer system 100 of FIG. 1.

Referring to FIG. 4, at block 405 processing logic calls new instructions that may include a function and/or variable included in source code. The processing logic may be a process that is in a runtime state (e.g., a process that is being executed by a processor). The source code may be a user readable string of high level language computer code (e.g., source code). In one embodiment, the source code is included in an uncompiled file. The uncompiled file may be, for example, a text file that includes instructions that can be read by a compiler such as a C/C++ compiler, a Java compiler, etc.

At block 410, processing logic loads a compiler. The compiler may be an independent program (e.g., a separate executable file that is not part of a library) and/or may be a component of a library such as a dynamically linked library and/or a shared library. If the compiler is an independent program, it may be executed with a command line that is different from what it would have if it were being executed in the ordinary course of compiling a unit of code. For example in the GNU Compiler Collection (GCC), it may be passed "-fpipe" to tell it to read from its standard input instead of a file, or it may be passed "-fpic" or "-fPIC" to produce position independent code. For other compilers, other commands may be passed. If the compiler is a subroutine of a dynamically linked library, it may be loaded using standard application programming interfaces (APIs) provided by an operating system on which processing logic operates.

At block 415, processing logic compiles the source code using the compiler to generate compiled machine code. Alternatively, the processing logic may compile the source code into byte code (e.g., Java byte code). The processing logic may also compile the source code into some other appropriate machine readable form. For example, in the Pascal language, the source code may be compiled into a variable length coding called p-code. P-code (also known as pseudo-code) is a form of compiled code that is designed to execute on a virtual machine called a pseudo-code machine. In another example, in the Forth programming language, the source code may be compiled into subroutine-threaded code that includes a sequence of machine code call instructions and/or address references.

At block 420, processing logic unloads the compiler.

At block 425, processing logic loads the compiled code into memory.

At block 430, processing logic retrieves the function and/or variable from the compiled code.

At block 435, processing logic executes the function and/or accesses the variable. Therefore, the functionality of the processing logic can be extended without a need to recompile, relink or change the code of the processing logic. New code can be repeatedly added on to the processing logic without a need for recompiling. This permits applications to be developed that call on functions that have not yet been completed when the applications are compiled, with the assumption that the functions will be created down the line.

At block 440, processing logic determines whether the function and/or variable is still needed. If the function and/or variable are still needed, the method may end. If the function and/or variable are no longer needed, then it may be unloaded from memory. The method then ends.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method, comprising:

loading, by a processing device, a compiled executable program comprising first compiled instructions, a compiler, and uncompiled instructions wrapped within an evaluation function, wherein the compiler is for a compiled programming language where translation is performed once for code of the compiled programmed language and not each time the code is run, wherein the compiled programming language is modified to include support for the evaluation function;

executing, by the processing device, the compiled executable program, wherein the executing comprises executing the first compiled instructions;

when the evaluation function is encountered during the executing, performing, by the evaluation function during the executing:

receiving the uncompiled instructions;

evaluating the uncompiled instructions as an individual executable unit of code;

applying, in view of the evaluating, at least one of a function definition structure or a class definition structure to an entirety of the uncompiled instructions, the applying to enable the uncompiled instructions to be compiled as an independent unit; and calling the compiler to compile the evaluated uncompiled instructions to yield second compiled instructions;

loading the second compiled instructions into memory; and executing the second compiled instructions as part of executing the compiled executable program.

2. The method of claim 1, wherein the encountering of the evaluation function causes loading of the compiler.

3. The method of claim 1, wherein the evaluation function comprises a scope that defines a variable, and wherein the evaluation function is executed in the scope to provide access to the variable.

4. The method of claim 1, wherein the evaluation function is a subroutine of a dynamically linked library.

5. The method of claim 1, wherein the compiler is a subroutine of a dynamically linked library, and wherein loading the compiled executable program comprises loading the compiler.

6. The method of claim 1, wherein the compiler is one of a C compiler, a C++ compiler, or a Java® compiler.

7. The method of claim 1, wherein the compiled instructions comprise one of machine code, byte code, p-code, and threaded code.

8. A non-transitory computer-readable storage medium having instructions stored thereon that, when executed by a processing device, cause the processing device to perform operations, comprising:

loading, by the processing device, a compiled executable program comprising first compiled instructions, a compiler, and uncompiled instructions wrapped within an evaluation function, wherein the compiler is for a compiled programming language where translation is performed once for code of the compiled programmed language and not each time the code is run, wherein the compiled programming language is modified to include support for the evaluation function;

executing, by the processing device, the compiled executable program, wherein the executing comprises executing the first compiled instructions;

when the evaluation function is encountered during the executing, performing, by the evaluation function during the executing:

receiving the uncompiled instructions;

evaluating the uncompiled instructions as an individual executable unit of code;

applying, in view of the evaluating, at least one of a function definition structure or a class definition structure to an entirety of the uncompiled instructions, the applying to enable the uncompiled instructions to be compiled as an independent unit; and calling the compiler to compile the evaluated uncompiled instructions to yield second compiled instructions;

loading the second compiled instructions into memory; and executing the second compiled instructions as part of executing the compiled executable program.

9. The non-transitory computer-readable storage medium of claim 8, wherein the evaluation function loads the compiler during runtime of the compiled executable program.

10. The non-transitory computer-readable storage medium of claim 9, wherein the evaluation function comprises a scope that defines a variable, and wherein the evaluation function is executed in the scope to provide access to the variable.

11. The non-transitory computer-readable storage medium of claim 8, wherein the evaluation function is a subroutine of a dynamically linked library.

12. The non-transitory computer-readable storage medium of claim 8, wherein the compiler is a subroutine of a dynamically linked library, and wherein loading the compiled executable program comprises loading the compiler.

13. The non-transitory computer-readable storage medium of claim 8, wherein the compiler is one of a C compiler, a C++ compiler, or a Java® compiler.

14. The non-transitory computer-readable storage medium of claim 8, wherein the compiled instructions comprise one of machine code, byte code, p-code, and threaded code.

15. A system, comprising:

a memory; and a processing device coupled to the memory that executes instructions to:

load a compiled executable program comprising first compiled instructions, a compiler, and uncompiled instructions wrapped within an evaluation function, wherein the compiler is for a compiled programming language where translation is performed once for code of the compiled programmed language and not each time the code is run, wherein the compiled programming language is modified to include support for the evaluation function;

execute the compiled executable program, wherein the executing comprises executing the first compiled instructions;

when the evaluation function is encountered during the executing, perform, by the evaluation function during the executing:

receiving the uncompiled instructions;

evaluating the uncompiled instructions as an individual executable unit of code;

applying, in view of the evaluating, at least one of a function definition structure or a class definition structure to an entirety of the uncompiled instructions, the applying to enable the uncompiled instructions to be compiled as an independent unit; and calling the compiler to compile the evaluated uncompiled instructions to yield second compiled instructions;
load the second compiled instructions into memory; and
execute the second compiled instructions as part of executing the compiled executable program.

16. The system of claim 15, wherein the memory comprises a dynamically linked library, and wherein the evaluation function is a subroutine of the dynamically linked library.

17. The system of claim 15, wherein the memory comprises a dynamically linked library, wherein the compiler is a subroutine of the dynamically linked library, and wherein loading the compiled executable program comprises loading the compiler.

18. The system of claim 15, wherein the compiler is one of a C compiler, a C++ compiler, or a Java® compiler.

19. The system of claim 15, wherein the compiled instructions are one of machine code, byte code, p-code, and threaded code.

20. A system, comprising:
a memory; and
a processing device coupled to the memory that executes instructions to:
compile, when executing a compiled program of a compiled programming language, uncompiled source code wrapped in an evaluation function in the compiled program to generate compiled code, wherein translation is performed once for code of the compiled programmed language and not each time the code is run, and wherein the compiled program is in a compiled programming language that is modified to include support for the evaluation function;
the evaluation function to:
evaluate the uncompiled instructions as an individual executable unit of code; and
apply, in view of the evaluating, at least one of a function definition structure or a class definition structure to an entirety of the uncompiled instructions, the applying to enable the uncompiled instructions to be compiled as an independent unit;
generate a frame descriptor comprising information identifying a local variable in an enclosing scope of the evaluation function; and
record information identifying how to find a global variable in the enclosing scope of the evaluation function.

21. The system of claim 20, wherein the evaluation function is a component of the compiled program, the evaluation function to call a compiler and pass the uncompiled source code to the compiler when executing the compiled program.

22. The system of claim 20, wherein the memory comprises a dynamically linked library, and wherein the compiling is performed by a compiler subroutine of the dynamically linked library.

23. The system of claim 20, wherein the compiling is performed by one of a C compiler, a C++ compiler, or a Java® compiler.

24. The system of claim 20, wherein the compiled code is one of machine code, byte code, p-code, and threaded code.

* * * * *